United States Patent
Musale et al.

(10) Patent No.: US 8,889,008 B2
(45) Date of Patent: Nov. 18, 2014

(54) METHOD OF CONDITIONING A MIXED LIQUOR CONTAINING NONIONIC POLYSACCHARIDES AND/OR NONIONIC ORGANIC MOLECULES

(75) Inventors: Deepak A. Musale, Aurora, IL (US);
John H. Collins, Bloomingdale, IL (US)

(73) Assignee: Nalco Company, Naperville, IL (US)

(*) Notice: Subject to any disclaimer, the term of this patent is extended or adjusted under 35 U.S.C. 154(b) by 1172 days.

(21) Appl. No.: 12/114,438

(22) Filed: May 2, 2008

(65) Prior Publication Data
US 2009/0272691 A1 Nov. 5, 2009

(51) Int. Cl.
*B01D 61/14* (2006.01)
*C02F 1/54* (2006.01)
*B01D 41/00* (2006.01)
*C02F 1/56* (2006.01)
*B01D 61/02* (2006.01)
*C02F 3/12* (2006.01)

(52) U.S. Cl.
CPC ........... *B01D 61/147* (2013.01); *C02F 1/56* (2013.01); *B01D 61/025* (2013.01); *B01D 61/027* (2013.01); *C02F 3/1273* (2013.01); *B01D 2311/2688* (2013.01); *B01D 61/145* (2013.01)
USPC ........... 210/644; 210/650; 210/652; 210/702; 210/704; 210/705; 210/729; 210/734; 210/735; 210/738

(58) Field of Classification Search
CPC ............. B01D 2311/12; B01D 61/025; B01D 61/027; B01D 61/145; B01D 61/147; B01D 2311/2688; B01D 61/04; B01D 61/16; C02F 1/56; C02F 3/1273
USPC ........ 210/652, 631, 702, 704, 705, 729–739, 210/749, 765, 644, 650, 665, 666
See application file for complete search history.

(56) References Cited

U.S. PATENT DOCUMENTS

| | | | |
|---|---|---|---|
| 3,472,765 A | 10/1969 | Budd et al. | |
| 4,749,494 A | 6/1988 | Tomoyasu et al. | |
| 5,248,424 A * | 9/1993 | Cote et al. | 210/636 |
| 5,254,253 A | 10/1993 | Behmann | |
| 5,266,203 A | 11/1993 | Mukhopadhyay et al. | |
| 5,494,577 A | 2/1996 | Rekers | |
| 5,558,774 A | 9/1996 | Tonelli et al. | |
| 5,914,040 A | 6/1999 | Pescher et al. | |

(Continued)

FOREIGN PATENT DOCUMENTS

| EP | 888810 | 1/1999 |
|---|---|---|
| JP | 63091196 | 4/1988 |

(Continued)

OTHER PUBLICATIONS

"HYDRACoRe Chlorine Tolerant Spiral Wound Nanofiltration Color Removal Membrane Elements", Technical Application Bulletin No. 109, Revision B, Hydranautics A Nitto Denko Corporation, www.membranes.com, pp. 1-10, Feb. 22, 2002.

(Continued)

*Primary Examiner* — John Kim
(74) *Attorney, Agent, or Firm* — Benjamin E. Carlsen

(57) ABSTRACT

A method of conditioning a membrane biological reactor mixed liquor containing one or more nonionic polysaccharides and/or one or more organic molecules is disclosed.

31 Claims, 3 Drawing Sheets

(56) References Cited

U.S. PATENT DOCUMENTS

| | | | |
|---|---|---|---|
| 5,932,099 | A | 8/1999 | Cote et al. |
| 6,313,246 | B1 | 11/2001 | Carter et al. |
| 6,416,668 | B1 * | 7/2002 | Al-Samadi .................. 210/636 |
| 6,428,705 | B1 | 8/2002 | Allen et al. |
| 6,517,723 | B1 | 2/2003 | Daigger et al. |
| 6,723,245 | B1 | 4/2004 | Collins et al. |
| 2003/0159990 | A1 | 8/2003 | Collins et al. |
| 2004/0168980 | A1 * | 9/2004 | Musale et al. ............... 210/639 |

FOREIGN PATENT DOCUMENTS

| | | |
|---|---|---|
| JP | 3004996 | 1/1991 |
| JP | 4004098 | 1/1992 |
| JP | 534195 | 12/1993 |
| JP | 7232192 | 9/1995 |

OTHER PUBLICATIONS

"Death Taxes . . . and RO Membrane Fouling", GE Water Technologies, Water Technology 69, www.gewater.com/library/tp/701_Death_Taxes.jsp, pp. 1-6, Nov. 1995.

Gould, C.K., Harrold, S.J., Weitnauer, A.K., "A Practical Approach to Controlling the Fouling of Ultrafiltration Membranes: A Case Study of the Successful Development of a Commercial Soy Protein Application", www.environmental-center.com/articles/article384/article384.htm, pp. 1-14, Apr. 1992.

Roquebert, V., Cleveland, C., Leaf, D., "Identifying and Resolving Key Design Considerations for Integration of Low Pressure Membrane Filtration and Lime Softening Process", AWWA Membrane Technology Conference, Atlanta, Georgia, 2003.

Layson, A., "Microfiltration—Current Know-how and Future Directions", IMSTEC, Sydney, Australia, 2003.

Bergman, R.A., Joffe, D., Adams, N., Porter, R., "Gwinnett County Water Reclamation with 50 mgd Ultrafiltration—Proof Testing and Design", American Water Works Association, Membrane Technology Conference, pp. 1-13, 2003.

-Ing., D., Nguyen, M.-T., Ripperger, S., "Effect of Flocculants on the Microfiltration of Fine Suspension", Lehrstuhl für Mechanische Verfahrenstechnik, Technische Universität Dresden, MVT, International Congress on Membranes & Membrane Process, Jul. 2002.

Nguyen, M.-T., Ripperger, S., "Investigation on the effect of flocculants on the filtration behavior in microfiltration of fine particles", Desalination 147, pp. 37-42, Elsevier Science B.V., 2002.

Wakeman, R.J., Akay, G., "Flux decay and rejection during micro- and ultra-filtration of hydrophobically modified water-soluble polymers", Journal of Membrane Science 91, pp. 145-152, Elsevier Science B.V., 1994.

M. Gander et al., "Aerobic MBRs for domestic wastewater treatment: a review with cost considerations", Separation and Purification Technology, 18, (2000), 119-130.

"Livestock Wastewater Treatment and Reuse System", Case Report, Mitsubishi Rayon Co., Ltd. (2000).

"Dairy and Ume Plum Processing Wastewater Treatment System", Case Report, Mitsubishi Rayon Co., Ltd. (2000).

"Food Plant Wastewater Treatment and Recycling System", Case Report, Mitsubishi Rayon Co., Ltd. (2000).

"Noodle Plant Wastewater Treatment System", Case Report, Mitsubishi Rayon Co., Ltd. (2000).

"Confectionary Plant Wastewater Treatment System", Case Report, Mitsubishi Rayon Co., Ltd. (2000).

"Local Brewery Wastewater Treatment System", Case Report, Mitsubishi Rayon Co., Ltd. (2000).

"Family Restaurant Sewage Treatment System", Case Report, Mitsubishi Rayon Co., Ltd. (2000).

"Tofu Plant Wastewater Treatment System", Case Report, Mitsubishi Rayon Co., Ltd. (2000).

"Wastewater Recycling at a Resort Hotel", Case Report, Mitsubishi Rayon Co., Ltd. (2000).

"Advanced Treatment of Hospital Wastewater", Case Report, Mitsubishi Rayon Co., Ltd. (2000).

* cited by examiner

METHOD OF CONDITIONING A MIXED LIQUOR CONTAINING NONIONIC POLYSACCHARIDES AND/OR NONIONIC ORGANIC MOLECULES

FIELD OF THE INVENTION

This invention pertains to a method of conditioning a membrane biological reactor (MBR) mixed liquor containing one or more nonionic polysaccharides and/or nonionic organic molecules.

BACKGROUND OF THE INVENTION

Biological treatment of wastewater for removal of dissolved organics is well known and is widely practiced in both municipal and industrial plants. This aerobic biological process is generally known as the "activated sludge" process in which microorganisms consume the organic compounds through their growth. The process necessarily includes sedimentation of the microorganisms or "biomass" to separate it from the water and thus the final effluent with reduced Biological Oxygen Demand (BOD) and TSS (Total Suspended Solids) is obtained. The sedimentation step is typically done in a clarifier unit. Thus, the biological process is constrained by the need to produce biomass that has good settling properties. These conditions are especially difficult to maintain during intermittent periods of high organic loading and the appearance of contaminants that are toxic to the biomass.

Membranes coupled with biological reactors (MBRs) for the treatment of wastewater are well known, but are not widely practiced yet. In these systems, ultrafiltration (UF), microfiltration (MF) or nanofiltration (NF) membranes replace sedimentation of biomass for solids-liquid separation. The membrane can be installed in the bioreactor tank or in an adjacent tank where the mixed liquor is continuously pumped from the bioreactor tank and back producing effluent with much lower total suspended solids (TSS), typically less than 5 mg/L, compared to 20 to 50 mg/L from a clarifier. More importantly, these MBRs de-couple the biological process from the need to settle the biomass, since the biomass separation from the water is achieved by membrane. This allows operation of the biological process at conditions that would be untenable in a conventional system including: 1) high MLSS (bacteria loading) of 10-30 g/L, 2) extended sludge retention time, and 3) short hydraulic retention time. In a conventional system, such conditions could lead to sludge bulking and poor settleability.

The benefits of the MBR operation include low sludge production, almost complete solids removal from the effluent, effluent disinfection, combined COD, solids and nutrient removal in a single unit, high loading rate capability, no problems with sludge bulking, and small footprint. Disadvantages include aeration limitations, membrane fouling, and membrane costs.

Membrane costs are directly related to the membrane area needed for a given volumetric flow through the membrane, or "flux." Flux is expressed as liters/m$^2$/hour (LMR) or gallons/ft$^2$/day (GFD). Typical flux rates in MBRs vary from approximately 10 LMH to about 20 LMH. These flux rates are relatively lower compared to those observed in drinking water applications (>50 LMH) with membranes having similar pore size and chemistries. These lower flux rates are mainly due to fouling of the membranes, and are the main reason for slower growth of MBR systems for wastewater treatment.

The MBR membrane interfaces with so-called "mixed liquor" which is composed of water, dissolved solids such as proteins, polysaccharides, suspended solids such as colloidal and particulate material, aggregates of bacteria or "flocs", free bacteria, protozoa, and various dissolved metabolites and cell components. In operation, the colloidal and particulate solids and dissolved organics deposit on the surface of the membrane. Colloidal particles form a layer on the surface of the membrane called a "cake layer." Cake layer formation is especially problematic in MBRs operated in the "dead end" mode where there is no cross flow; i.e., flow tangential to the membrane. Depending on the porosity of the cake layer, hydraulic resistance increases and flux declines.

In addition to the cake formation on the membrane, small particles can plug the membrane pores, a fouling condition that may not be reversible. Compared to a conventional activated sludge process, floe (particle) size is reportedly much smaller in typical MBR units. Since MBR membrane pore size varies from about 0.04 to about 0.4 µm, particles smaller than this can cause pore plugging. Pore plugging increases resistance for permeation through membrane and decreases flux.

In addition to these physical fouling mechanisms, the soluble polysaccharides (from "Biopolymer") adsorb on the membrane surface as well as on the pore walls and form a slimy layer, thus contributing significantly to the total resistance for water permeation. It is known in the literature that extra-cellular polysaccharides secreted by bacteria include both anionic (e.g. uronic acids) as well as nonionic oligo and polysaccharides (e.g. hexoses and pentoses). Conditioning the mixed liquor with cationic, amphoteric or zwitterionic polymers results in complexation of only charged polysaccharides. The nonionic oligo/polysaccharides still form a slimy layer on the membrane surface, resulting in increased resistance for permeation.

Therefore, there is a need to develop improved methods of conditioning the mixed liquor in MBR systems to also address the fouling caused by nonionic oligo/polysaccharides and/or nonionic organic molecules, and increase the flux of the membranes.

FIGURES/DRAWINGS

SUMMARY OF THE INVENTION

Figure 1:
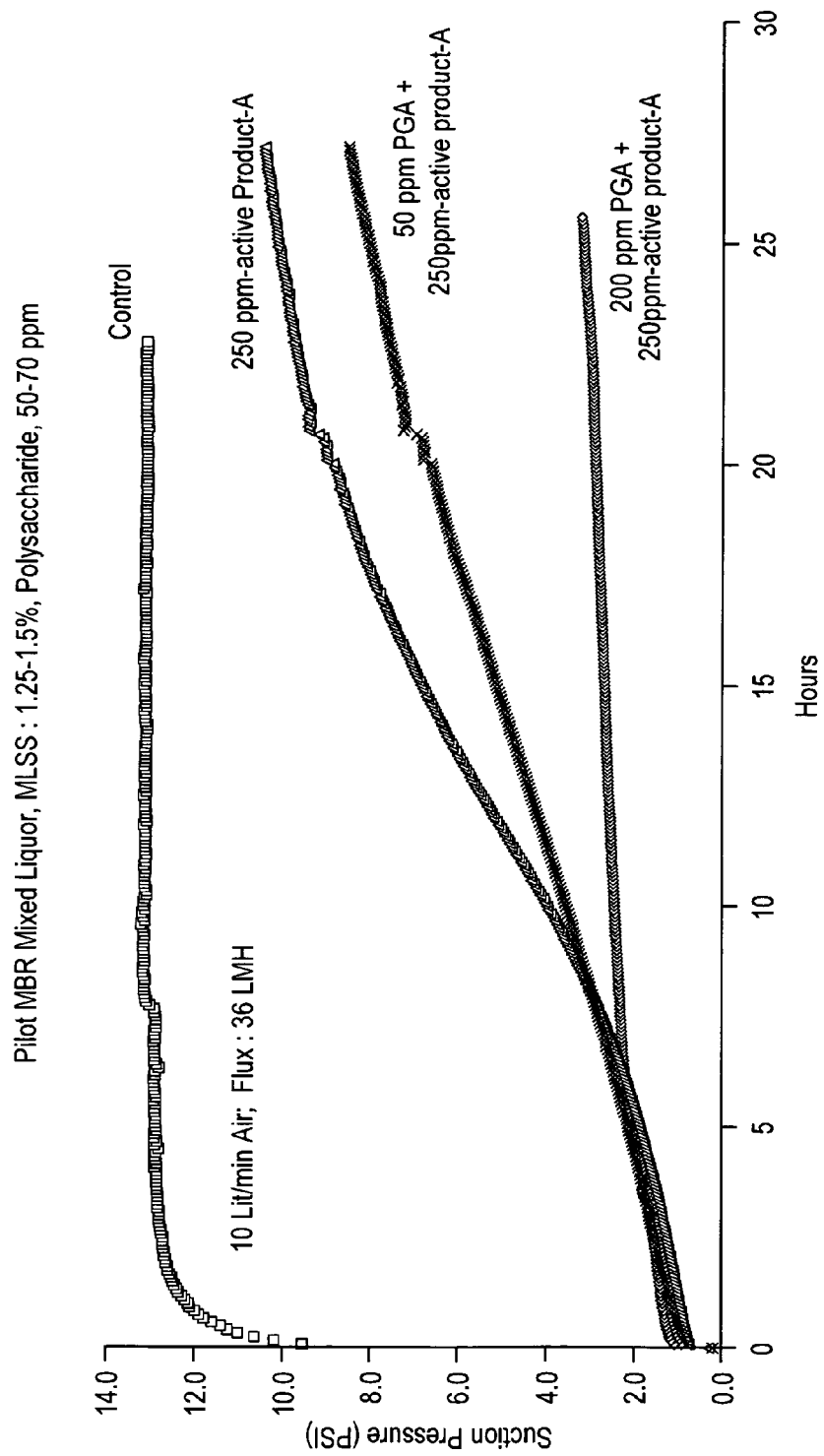
FIG. 1 shows the effect of sequential addition of PGA (polygalacturanic acid) and Product A in Pilot MBR mixed liquor on suction pressure increase for a 24 hr period.

This invention pertains to a method of conditioning a membrane biological reactor mixed liquor containing one or more nonionic polysaccharides and/or one or more organic molecules that are nonionic comprising: (a) selecting one or more anionic polymers that have the ability to complex or associate with one or more nonionic polysaccharides and/or one or more organic molecules that are nonionic; (b) adding a composition containing one or more water soluble anionic polymers selected from step (a) to the mixed liquor; and (c) adding one or more water soluble amphoteric, cationic or zwitterionic polymers, or combination thereof to the mixed liquor after performing step b.

This invention also pertains to a method of conditioning a membrane biological reactor mixed liquor containing one or more nonionic polysaccharides and/or one or more organic molecules that are nonionic comprising: (a) selecting one or more anionic polymers that have the ability to complex or associate with one or more nonionic polysaccharides and/or one or more organic molecules that are nonionic; (b) adding one or more water soluble amphoteric, cationic or zwitterionic polymers, or combination thereof to the mixed liquor; and (c) adding a composition containing one or more water soluble anionic polymers selected from step (a) to the mixed liquor;

DETAILED DESCRIPTION OF THE INVENTION

Throughout this patent application the following terms have the indicated meanings.

"MBR" means membrane biological reactor.

"Amphoteric polymer" means a polymer derived from both cationic monomers and anionic monomers, and, possibly, other non-ionic monomer(s). Amphoteric polymers can have a net positive or negative charge. The amphoteric polymer may also be derived from zwitterionic monomers and cationic or anionic monomers and possibly nonionic monomers. The amphoteric polymer is water soluble.

"Cationic polymer" means a polymer having an overall positive charge. The cationic polymers of this invention may be prepared by polymerizing one or more cationic monomers, by copolymerizing one or more nonionic monomers and one or more cationic monomers, by condensing epichlorohydrin and a diamine or polyamine or condensing ethylenedichloride and ammonia or formaldehyde and an amine salt. The cationic polymer is water soluble.

"Zwitterionic polymer" means a polymer composed from zwitterionic monomers and, possibly, other non-ionic monomer(s). In zwitterionic polymers, all the polymer chains and segments within those chains are rigorously electrically neutral. Therefore, zwitterionic polymers represent a subset of amphoteric polymers, necessarily maintaining charge neutrality across all polymer chains and segments because both anionic charge and cationic charge are introduced within the same zwitterionic monomer. The zwitterionic polymer is water-soluble.

"Anionic polymer" means a polymer having an overall negative charge. It also means, in addition to the negative charge, the anionic polymer has functionalities and ability for association with neutral/non-ionic oligo/polysaccharide and/or other non-ionic organics present in the mixed liquor of MBR. It may be natural or synthetic. The anionic polymer is water-soluble.

"Mixed Liquor" or "sludge" means a mixture of wastewater, microorganisms used to degrade organic materials in the wastewater, organic-containing material derived from cellular species, cellular by-products and/or waste products, or cellular debris. Mixed liquor can also contain colloidal and particulate material (i.e. biomass/biosolids) and/or soluble molecules or biopolymers (i.e. neutral and charged oligo/polysaccharides, proteins, etc.);

MLSS: Mixed Liquor Suspended Solid (mg $L^{-1}$ or ppm) means the concentration of biomass which is treating organic material, in the mixed liquor.

"DMAEA.MCQ" means dimethylaminoethylacrylate.methylchloride quaternary salt.

"DADMAC" means diallyldimethylammonium chloride.

"Nonionic" means having a net neutral charge. For example, a polysaccharide that is a non-ionic polysaccharide has a net neutral charge.

"Polysaccharide/polysaccharides" include polysaccharide(s) and/or oligosaccharide(s).

Preferred Embodiments

As stated above, the anionic polymers selected must have the ability to associate with one or more types of nonionic polymers and/or organic molecules that are nonionic.

One of ordinary skill in the art would understand what the word associate means. For example, association of a target molecule(s), e.g. nonionic polysaccharides and/or other non-ionic organic molecules with anionic polymer may occur by one or more of the following manners of association: H-bonding, ionic bonding; covalent bonding; co-ordination bonding, and Van der Waals' forces.

Factors such as mixed liquor salinity, pH, temperature and presence of H-bond breaking compounds such as urea may enhance or inhibit association.

In one embodiment, the association between anionic polymers and non-ionic polysaccharides in the mixed liquor is through H-bonding The amount of anionic polymer(s) added to the system depends on the type of mixed liquor.

In one embodiment, the anionic polymer is a polygalacturonic acid.

In another embodiment, the anionic polymers are selected from the group consisting of: glucuronic acid; mannuronic acid; pyruvic acid; alginic acid; salts thereof, and combination thereof.

In another embodiment, the anionic polymers with no limitation on stereochemistry or linkage type between the monomers are selected.

In another embodiment, the anionic polymers are homopolysaccharides or heteropolysaccharides.

In another embodiment, the anionic polymers could be branched or linear.

In another embodiment, the anionic polymers may be selected from those containing carboxylic acid, sulfonic acid or phosphoric acid functionality and H-bonding groups such as —OH, —NH and/or —SH. Various amounts of anionic polymers may be added to the mixed liquor.

In another embodiment, the amount of anionic polymer added to the mixed liquor is from about 5 ppm to about 10,000 ppm based upon active solids. In a further embodiment, the amount of anionic polymer added to the mixed liquor is from about 10 ppm to about 200 ppm based upon active solids.

The target species for said anionic polymers include neutral/nonionic polysaccharides, containing e.g. several —OH groups, and/or other nonionic organic molecules.

The nonionic polysaccharides may be of various types. Depending on the mixed liquor that is being conditioned by the polymers, the types of nonionic polysaccharides may vary from system to system.

In one embodiment, the non-ionic polysaccharides are selected from the group consisting of: rhamnose, pyranose, galactose, mannose, dextrans and glucans.

Those skilled in the art would know that the non-ionic polysaccharides could be other types of hexoses and pentoses, than those mentioned above.

In one embodiment, the non-ionic polysaccharides could be homopolysaccharides or heteropolysaccharides.

In another embodiment, the non-ionic polysaccharides could be branched or linear.

In another embodiment, the non-ionic organic molecules from mixed liquor that are targeted for association by the anionic polymers are selected from the group consisting of: amines; alcohols; glycerols; glycols; and a combination thereof.

After performing the addition of the step of adding anionic polymers to the mixed liquor, including, but not necessarily, subsequent to the addition of anionic polymers, one or more water soluble amphoteric, cationic, or zwitterionic polymers, or a combination thereof are added to the mixed liquor.

In one embodiment, the amphoteric polymers are selected from the group consisting of: acrylic acid/DMAEA.MCQ copolymer, DADMAC/acrylic acid copolymer, DADMAC/acrylic acid/acrylamide terpolymer, and a combination thereof.

In another embodiment, the amphoteric polymers have a molecular weight from about 5,000 daltons to about 2,000,000 daltons.

In another embodiment, the amphoteric polymers have a molecular weight from about 1,000,000 daltons to about 2,000,000 daltons.

In another embodiment, the amphoteric polymers have a cationic charge equivalent to anionic charge equivalent ratio of about 0.2:9.8 to about 9.8:0.2.

In another embodiment, the amphoteric polymer is a 70 mole %/30 mole % blend of DMAEA.MCQ and acrylic acid. This is a preferred amphoteric polymer because it consistently exhibits good flux enhancement.

In another embodiment, the cationic polymer is a copolymer of acrylamide and one or more cationic monomers selected from the group consisting of: diallyldimethylammonium chloride; dimethylaminoethylacrylate methyl chloride quaternary salt; dimethylaminoethylmethacrylate methyl chloride quaternary salt; and dimethylaminoethylacrylate benzyl chloride quaternary salt.

In another embodiment, the cationic polymers have a cationic charge of at least about 5 mole percent.

In another embodiment, the cationic polymers have a cationic charge of 100 mole percent.

In another embodiment, the cationic polymers have a molecular weight of from about 2,000,000 daltons to about 5,000,000 daltons.

In another embodiment, the cationic polymer is selected from the group consisting of: polydiallyldimethylammonium chloride; polyethyleneimine; polyepiamine; polyepiamine crosslinked with ammonia or ethylenediamine; condensation polymer of ethylenedichloride and ammonia; condensation polymer of triethanolamine and tall oil fatty acid; poly(dimethylaminoethylmethacrylate sulfuric acid salt); and poly(dimethylaminoethylacrylate methyl chloride quaternary salt).

In another embodiment, the amphoteric polymers are selected from the group consisting of: dimethylaminoethyl acrylate methyl chloride quaternary salt/acrylic acid copolymer; diallyldimethylammonium chloride/acrylic acid copolymer; dimethylaminoethyl acrylate methyl chloride salt/N,N-dimethyl-N-methacrylamidopropyl-N-(3-sulfopropyl)-ammonium betaine copolymer; acrylic acid/N,N-dimethyl-N-methacrylamidopropyl-N-(3-sulfopropyl)-ammonium betaine copolymer and DMAEA.MCQ/Acrylic acid/N,N-dimethyl-N-methacrylamidopropyl-N-(3-sulfopropyl)-ammonium betaine terpolymer.

In another embodiment, the zwitterionic polymers are selected from the group consisting of: N, N-dimethyl-N-(2-acryloyloxyethyl)-N-(3-sulfopropyl) ammonium betaine; copolymer of acrylamide and N, N-dimethyl-N-(2-acryloyloxyethyl)-N-(3-sulfopropyl) ammonium betaine; and ter-polymer of acrylamide, N-vinyl-2-pyrrolidone; and 1-(3-sulfopropyl)-2-vinylpyridinium betaine.

In another embodiment, the water soluble zwitterionic polymer is composed of about 1 to about 99 mole percent of N,N-dimethyl-N-methacrylamidopropyl-N-(3-sulfopropyl)-ammonium betaine and about 99 to about 1 mole percent of one or more nonionic monomers.

In another embodiment, the water soluble zwitterionic polymers have a molecular weight from about 5,000 daltons to about 2,000,000 daltons.

In another embodiment, the anionic polymers have a molecular weight from about 1,000 daltons to about 2,000,000 daltons.

The conditioning method may be a part of broader method of purification.

In one embodiment, the method further comprises: purifying the conditioned mixed liquor by further processing the mixed liquor through one or more membranes selected from the group consisting of: ultrafiltration membranes; microfiltration membranes; nanofiltration membranes; and reverse osmosis membranes.

The conditioning protocol can be applied to various types of treatment facilities.

In one embodiment, the mixed liquor is from a membrane biological reactor for treating municipal, institutional (e.g. resorts, apartment complexes, hotels, schools), or industrial wastewater.

There may be various amounts of nonionic polysaccharides in the mixed liquor.

In one embodiment, there is at least 10% of nonionic polysaccharides based upon the total amount of nonionic species in the mixed liquor.

The following examples are not meant to be limiting.

EXAMPLES

A. Experimental Protocol

Since polygalacturonic acid (PGA) is one of the anionic polysaccharides found in extra-cellular polysaccharides, it was chosen for testing. Product A (an amphoteric DMAEA.MCQ (70 mole %)-Acrylic acid (30 mole %) copolymer with net positive charge) was used for second step after conditioning the mixed liquor with PGA. Currently the MBtR plants typically run at 12-25 LMR due to severe fouling at higher fluxes. Therefore, fouling control for longer period at higher flux of e.g. 36 LMH would be of great interest to MBR users.

Figure 2:
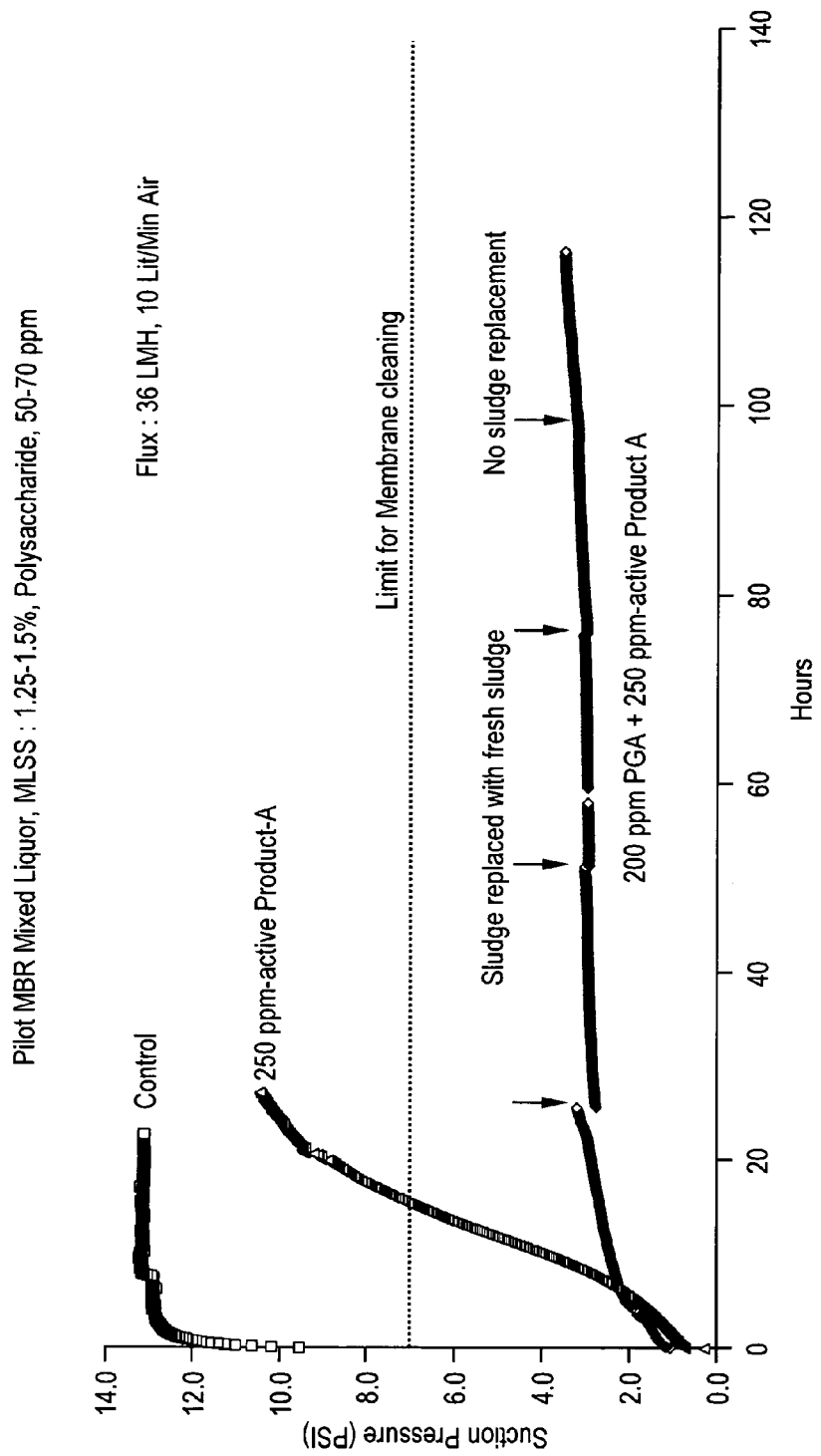
FIG. 2 shows the effect of sequential addition of PGA and Product A in Pilot MBR mixed liquor on suction pressure increase for a period of 5 days.

The experimental protocol involved the following sequence:
1) addition of mixed liquor in the flow-through cell tanks containing cleaned membranes (7.5 L each in control and treatment),
2) addition of Na salt of PGA (referred hereafter as PGA) at various concentrations in the treatment tank and mixing for 10 minutes under aeration (10 Liter/min),
3) addition of 250 ppm-active product A and mixing for 10 minutes under aeration, and
4) permeate suction at 36 LMH and 10 lit/min membrane aeration (flat plate membrane with active area of 0.1 m$^2$), while monitoring the suction pressure B. Results FIG. 1 shows the effect of addition of PGA at various concentrations, followed by product-A for mixed liquor conditioning on the suction pressure of membrane at 36 LMH flux with a mixed liquor obtained from a pilot MBR that was operated using a synthetic wastewater. Higher the suction pressure, higher the membrane fouling. MBR plants typically clean the membranes after the suction pressure reaches 7-8 psi. It is apparent from FIG. 1 that the suction pressure for control reached 12 psi within 30 minutes, whereas at the end of the 24 hours, the suction pressures decreased from 10 psi with Product-A alone, to 8 psi with 50 ppm PGA+250 ppm-activeProduct-A and to about 3 psi with 100 or 200 ppm PGA+250 ppm-active Product-A. The next experiment was conducted to evaluate the sustainability of above results for longer period with 200 ppm PGA+250 ppm-active Product-A, with sludge replacement and treatment every 24 hours. As shown in FIG. 2, the sequential addition resulted in suction pressure increase up to only 3 psi after 5 days of continuous operation.

Figure 3:
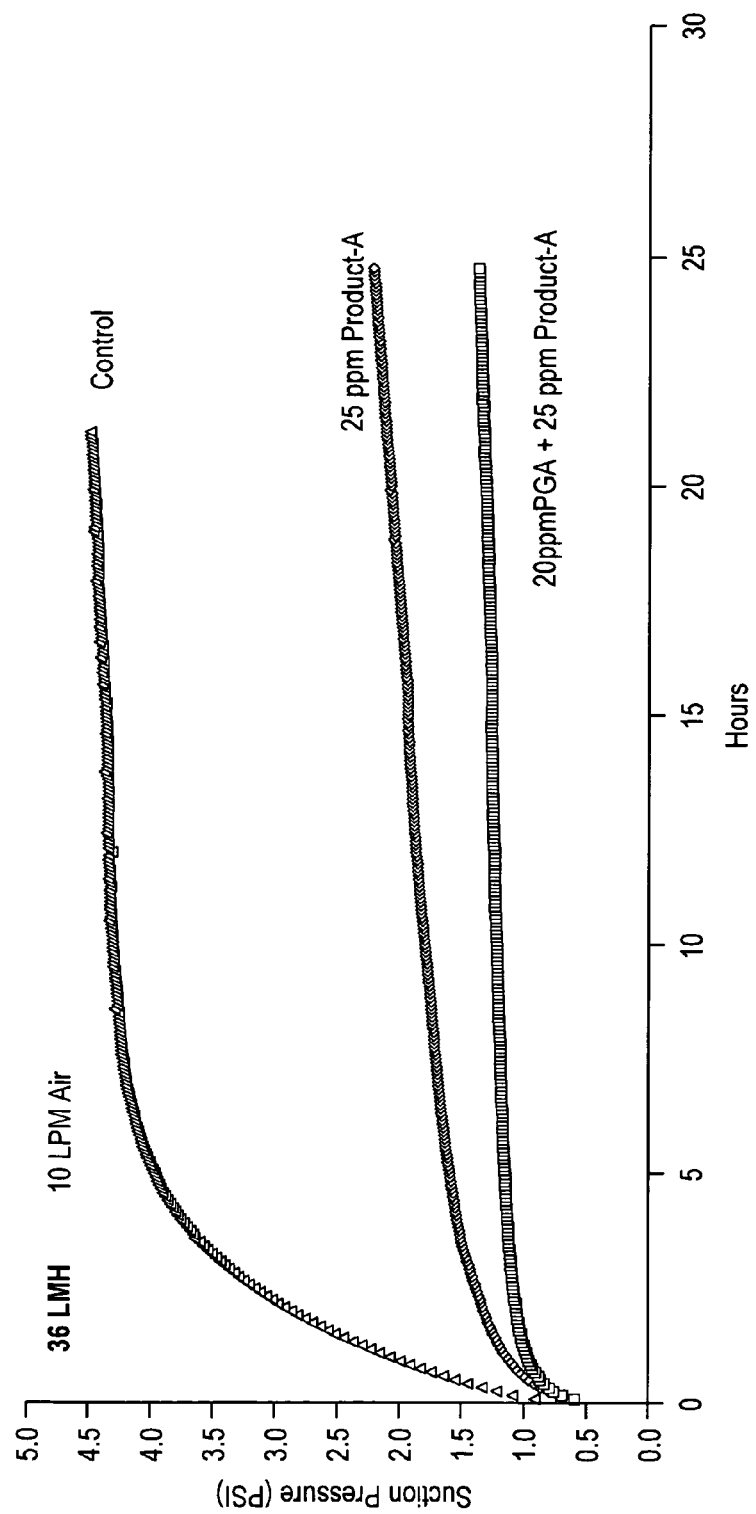
FIG. 3 shows the effect of sequential addition of PGA and Product A in Western US MBR plant mixed liquor on suction pressure increase for a 24 hr period.

The method of this invention was also tested with mixed liquor obtained from Western US full-scale municipal MBR plant. This mixed liquor had lower MLSS (0.97%) and polysaccharide level (7 ppm) compared to pilot HMR mentioned above (1.25-1.5% and 50-70 ppm, respectively). Therefore PGA and Product-A concentrations were chosen to be 20 ppm and 25 ppm, both as active solids, respectively. The results for a 24 hours experiment are shown in FIG. 3. The beneficial effect of sequential addition is apparent with this low fouling mixed liquor as well.

Thus, the sequential chemical addition method resulted in fouling reduction at high flux of 36 LMH, with both high fouling and low fouling mixed liquors. Also, the COD removal was about 90% and thus not affected by the method of this invention.

We claim:

1. A method of treating a membrane biological reactor mixed liquor containing at least one nonionic polysaccharide and amines, alcohols, glycerols, and glycols, the method comprising:
    a. conditioning a membrane biological reactor mixed liquor by combining an amount of polygalacturonic acid or salt thereof and the membrane biological reactor mixed liquor, thereby creating a conditioned mixed liquor;
    b. after mixing the conditioned mixed liquor for about 10 minutes, further conditioning the conditioned mixed liquor by combining an amount of a water soluble amphoteric polymer and the conditioned mixed liquor, thereby creating a further conditioned mixed liquor; and
    c. after mixing the further conditioned mixed liquor for about 10 minutes, continuously passing the further conditioned mixed liquor through a membrane at a suction pressure ranging from 1 to 7 psi;
    wherein the amounts of the polygalacturonic acid or salt thereof and the water soluble amphoteric polymer in the further conditioned mixed liquor are sufficient to allow for continuous passing of the further conditioned mixed liquor through the membrane for at least 20 hours at a flux of 36 LMH and a suction pressure ranging from 1 to 7 psi.

2. The method of claim 1, wherein said water soluble amphoteric polymer is a dimethylaminoethyl acrylate methyl chloride quaternary salt/acrylic acid copolymer with net positive charge.

3. The method of claim 1, wherein the amount of the polygalacturonic acid or salt thereof combined with the mixed liquor is sufficient to provide a concentration of from about 10 ppm to about 200 ppm based upon active solids.

4. The method of claim 1, wherein said water soluble amphoteric polymer is dimethylaminoethyl acrylate methyl chloride quaternary salt (70 mole %)-acrylic acid (30 mole %) copolymer with net positive charge.

5. The method of claim 1, wherein the membrane is selected from the group consisting of: an ultrafiltration membrane; a microfiltration membrane; a nanofiltration membrane; a reverse osmosis membrane; and combinations thereof.

6. The method of claim 1, wherein the water soluble amphoteric polymer is selected from the group consisting of: acrylic acid/dimethylaminoethyl acrylate methyl chloride quaternary salt copolymer; diallyldimethylammonium chloride/acrylic acid copolymer; diallyldimethylammonium chloride/acrylic acid/acrylamide terpolymer; and combinations thereof.

7. The method of claim 1, wherein the water soluble amphoteric polymer has a molecular weight from about 5,000 daltons to about 2,000,000 daltons.

8. The method of claim 1, wherein the water soluble amphoteric polymer has a molecular weight from about 1,000,000 daltons to about 2,000,000 daltons.

9. The method of claim 1, wherein the water soluble amphoteric polymer has a cationic charge equivalent to anionic charge equivalent ratio of about 0.2:9.8 to about 9.8:0.2.

10. The method of claim 1, wherein the water soluble amphoteric polymer is a 70/30 mole % blend of dimethylaminoethyl acrylate methyl chloride quaternary salt and acrylic acid.

11. The method of claim 1, wherein the further conditioned mixed liquor or precursor thereof is conditioned with a cationic copolymer of acrylamide and a cationic monomer selected from the group consisting of: diallyldimethylammonium chloride; dimethylaminoethylacrylate methyl chloride quaternary salt; dimethylaminoethylmethacrylate methyl chloride quaternary salt; dimethylaminoethylacrylate belzyl chloride quaternary salt; and combinations thereof.

12. The method of claim 11, wherein the cationic copolymer has a cationic charge of at least about 5 mole percent.

13. The method of claim 11, wherein the cationic copolymer has a cationic charge of 100 mole percent.

14. The method of claim 11, wherein the cationic copolymer has a molecular weight from about 2,000,000 daltons to about 5,000,000 daltons.

15. The method of claim 1, wherein the further conditioned mixed liquor or precursor thereof is conditioned with a cationic polymer selected from the group consisting of: polydiallyldimethylammonium chloride; polyethyleneimine; polyepiamine; polyepiamine crosslinked with ammonia or ethylenediamine; condensation polymer of ethylenedichloride and ammonia; condensation polymer of triethanolamine and tall oil fatty acid; poly(dimethylaminoethylmethacrylate sulfuric acid salt); poly(dimethylaminoethylacrylate methyl chloride quaternary salt); and combinations thereof.

16. The method of claim 1, wherein the water soluble amphoteric polymer is selected from dimethylaminoethyl acrylate methyl chloride quaternary salt/acrylic acid copolymer; diallyldimethylammonium chloride/acrylic acid copolymer; dimethylaminoethyl acrylate methyl chloride salt/N,N-dimethyl-N-methacrylamidopropyl-N-(3-sulfopropyl)-ammonium betaine copolymer, acrylic acid/N,N-dimethyl-N-methacrylamidopropyl-N-(3-sulfopropyl)-ammonium betaine copolymer; dimethylaminoethyl acrylate methyl chloride quaternary salt/acrylic acid/N,N-dimethyl-N-methacrylamidopropyl-N-(3-sulfopropyl)-ammonium betaine terpolymer; and combinations thereof.

17. The method of claim 1, wherein the further conditioned mixed liquor or precursor thereof is conditioned with a zwitterionic polymer selected from the group consisting of N,N-dimethyl-N-(2-acryloyloxyethyl)-N-(3-sulfopropyl) ammonium betaine; copolymer of acrylamide and N,N-dimethyl-N-(2-acryloyloxyethyl)-N-(3-sulfopropyl) ammonium betaine; terpolymer of acrylamide, N-vinyl-2-pyrrolidone, and 1-(3-sulfopropyl)-2-vinylpyridinium betaine; and combinations thereof.

18. The method of claim 17, wherein the zwitterionic polymer comprises from about 1 to about 99 mole percent of N,N-dimethyl-N-methacrylamidopropyl-N-(3-sulfopropyl)-ammonium betaine and from about 99 to about 1 mole percent of one or more nonionic monomers.

19. The method of claim 17, wherein the zwitterionic polymer has a molecular weight ranging from about 5,000 daltons to about 2,000,000 daltons.

20. The method of claim 1, wherein at least a portion of the amount of the polygalacturonic acid or salt thereof is bonded to at least a portion of the one or more polysaccharides via hydrogen bonding.

21. The method of claim 1, wherein the further conditioned mixed liquor or precursor thereof is conditioned with an anionic polymer selected from the group consisting of: glucuronic acid, mannuronic acid, pyruvic acid, alginic acid, salts thereof, and combinations thereof.

22. The method of claim 1, wherein the at least one nonionic polysaccharide comprises one item selected from the group consisting of: rhamnose, pyranose, galactose, mannose, dextran, glucan, and combinations thereof.

23. The method of claim 1, wherein the membrane biological reactor mixed liquor is generated by a membrane biological reactor for treating municipal, institutional, or industrial wastewater.

24. A method of treating a membrane biological reactor mixed liquor comprising from 0.97% to 1.5% mixed liquor suspended solid, at least one nonionic polysaccharide and amines, alcohols, glycerols, and glycols, the method comprising:
  a. conditioning a membrane biological reactor mixed liquor by combining an amount of polygalacturonic acid or salt thereof and the membrane biological reactor mixed liquor, thereby creating a conditioned mixed liquor;
  b. further conditioning the conditioned mixed liquor by combining an amount of a water soluble amphoteric polymer and the conditioned mixed liquor, thereby creating a further conditioned mixed liquor; and
  c. continuously passing the further conditioned mixed liquor through a membrane at a suction pressure ranging from 1 to 7 psi;
  wherein about 4 parts by weight of the polygalacturonic acid or salt thereof is present in the further conditioned mixed liquor per about 5 parts by weight of the water soluble amphoteric polymer; and the amounts of the polygalacturonic acid or salt thereof and the water soluble amphoteric polymer in the further conditioned mixed liquor are sufficient to allow for continuous passing of the further conditioned mixed liquor through the membrane for at least 20 hours at a flux of 36 LMH and a suction pressure ranging from 1 to 7 psi.

25. The method of claim 24, wherein the further conditioned mixed liquor is continuously passed through the membrane for at least 40 hours at a flux of 36 LMH and a suction pressure ranging from 1 to 7 psi.

26. The method of claim 25, wherein the further conditioned mixed liquor is continuously passed through the membrane for at least 60 hours at a flux of 36 LMH and a suction pressure ranging from 1 to 7 psi.

27. The method of claim 25, wherein the further conditioned mixed liquor is continuously passed through the membrane for at least 80 hours at a flux of 36 LMH and a suction pressure ranging from 1 to 7 psi.

28. The method of claim 24, wherein the amount of the polygalacturonic acid or salt thereof combined with the mixed liquor is sufficient to provide a concentration of about 200 ppm based upon active solids, and the amount of amphoteric polymer combined with the conditioned mixed liquor is sufficient to provide a concentration of about 250 ppm based upon active solids.

29. The method of claim 24, wherein the amphoteric polymer is dimethylaminoethylacrylate methyl chloride quaternary salt/acrylic acid copolymer.

30. The method of claim 27, wherein the amphoteric polymer is dimethylaminoethylacrylate methyl chloride quaternary salt/acrylic acid copolymer.

31. The method of claim 28, wherein the amphoteric polymer is dimethylaminoethylacrylate methyl chloride quaternary salt/acrylic acid copolymer.

* * * * *